US009446755B2

(12) United States Patent
Murakami

(10) Patent No.: US 9,446,755 B2
(45) Date of Patent: Sep. 20, 2016

(54) STEERING SYSTEM

(71) Applicant: Mitsuo Murakami, Toyota (JP)

(72) Inventor: Mitsuo Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 13/963,436

(22) Filed: Aug. 9, 2013

(65) Prior Publication Data

US 2014/0066254 A1 Mar. 6, 2014

(30) Foreign Application Priority Data

Sep. 4, 2012 (JP) .................................. 2012-194462

(51) Int. Cl.
*B62D 5/30* (2006.01)
*B60W 10/20* (2006.01)
*B60W 10/06* (2006.01)
*B62D 1/20* (2006.01)
*B62D 5/00* (2006.01)

(52) U.S. Cl.
CPC .............. *B60W 10/20* (2013.01); *B60W 10/06* (2013.01); *B62D 1/20* (2013.01); *B62D 5/003* (2013.01); *B62D 5/30* (2013.01); *Y10T 477/71* (2015.01)

(58) Field of Classification Search
CPC ....... B60W 10/06; B60W 10/20; B62D 1/20; B62D 5/003; B62D 5/30

USPC ........ 180/402–405, 444; 701/43; 340/426.31
See application file for complete search history.

(56) References Cited

U.S. PATENT DOCUMENTS

| 6,220,385 | B1 * | 4/2001 | Bohner et al. ................. 180/403 |
| 8,185,270 | B2 * | 5/2012 | Hayama et al. ................. 701/43 |
| 2005/0082108 | A1 * | 4/2005 | Husain ........................... 180/402 |
| 2005/0205336 | A1 * | 9/2005 | Yamasaki et al. ............. 180/402 |
| 2006/0169519 | A1 | 8/2006 | Osonoi et al. |
| 2007/0137921 | A1 | 6/2007 | Kasahara |
| 2007/0144815 | A1 * | 6/2007 | Tsutsumi et al. ............. 180/402 |
| 2008/0185213 | A1 * | 8/2008 | Mori et al. .................... 180/402 |

FOREIGN PATENT DOCUMENTS

| CN | 1966332 A | 5/2007 |
| EP | 1995153 A1 | 11/2008 |
| EP | 2093125 A1 | 8/2009 |
| JP | A-2006-182302 | 7/2006 |
| JP | A-2006-335209 | 12/2006 |
| JP | A-2009-179185 | 8/2009 |

\* cited by examiner

*Primary Examiner* — Anne Marie Boehler
(74) *Attorney, Agent, or Firm* — Oliff PLC

(57) ABSTRACT

A vehicle steering system includes: a steering wheel having the capacity to steer a vehicle; a turning actuator having the capacity to turn a wheel; a backup clutch arranged between the steering wheel and the turning actuator and having the capacity to be able to mechanically connect the steering wheel to the turning actuator; and a clutch disengagement checking unit having the capacity to check whether the backup clutch is disengaged.

6 Claims, 7 Drawing Sheets

STEERING SYSTEM

INCORPORATION BY REFERENCE

The disclosure of Japanese Patent Application No. 2012-194462 filed on Sep. 4, 2012 including the specification, drawings and abstract is incorporated herein by reference in its entirety.

BACKGROUND OF THE INVENTION

1. Field of the Invention

The invention relates to a steering system for a vehicle and, more particularly, to a steer-by-wire steering system.

2. Description of Related Art

In recent years, various systems relating to steering of an automobile, that is, so-called steer-by-wire systems, have been developed for practical use. An existing vehicle is generally configured such that a steering wheel and steered wheels are mechanically coupled to each other via a mechanism, such as a rack-and-pinion. However, in a steer-by-wire system, there is no mechanical connection between these components. In the steer-by-wire system, an input from a driver, such as a torque and a steering angle, is detected by a sensor, a steered angle appropriate for a travel state of a vehicle is obtained together with information from another vehicle sensor, the steered angle command value is transmitted to a steering actuator, and then wheels are actually steered.

In some of steering systems that employ the steer-by-wire system, a backup clutch is provided between the steering wheel and the steered wheels. That is, even when the steer-by-wire system fails, the backup clutch mechanically connects the steering wheel to the steered wheels, thus making it possible to ensure steering performance.

In the steering system that employs such a steer-by-wire system, it is important that the steering wheel is reliably connected to the steered wheels by the backup clutch at the time of a failure of the system. Therefore, there is known an existing technique for, for example, when the power of a system is turned on, checking whether mechanical connection of a steering wheel with steered wheels by a backup clutch is normally performed by determining whether there occurs movement in the steered wheels and the steering wheel while a connection command is output to the backup clutch to drive a turning actuator and a steering reaction actuator (for example, see Japanese Patent Application Publication No. 2009-179185 (JP 2009-179185 A)).

However, in the system described in JP 2009-179185 A, there is a possibility that the backup clutch is not appropriately disengaged after checking the operation of the backup clutch and then the steering wheel and the steered wheels remain mechanically connected to each other. Thus, there is a possibility that steer-by-wire control is started while the steering wheel and the steered wheels are mechanically coupled to each other.

SUMMARY OF THE INVENTION

The invention provides a steering system having improved safety.

An aspect of the invention provides a steering system. The steering system includes: a steering member having the capacity to steer a vehicle; a turning mechanism having the capacity to turn a wheel of the vehicle; a clutch arranged between the steering member and the turning mechanism and having the capacity to be able to mechanically connect the steering member to the turning mechanism; and a disengagement checking unit having the capacity to check whether the clutch is disengaged.

According to this aspect, it is possible to improve the safety of the vehicle steering system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
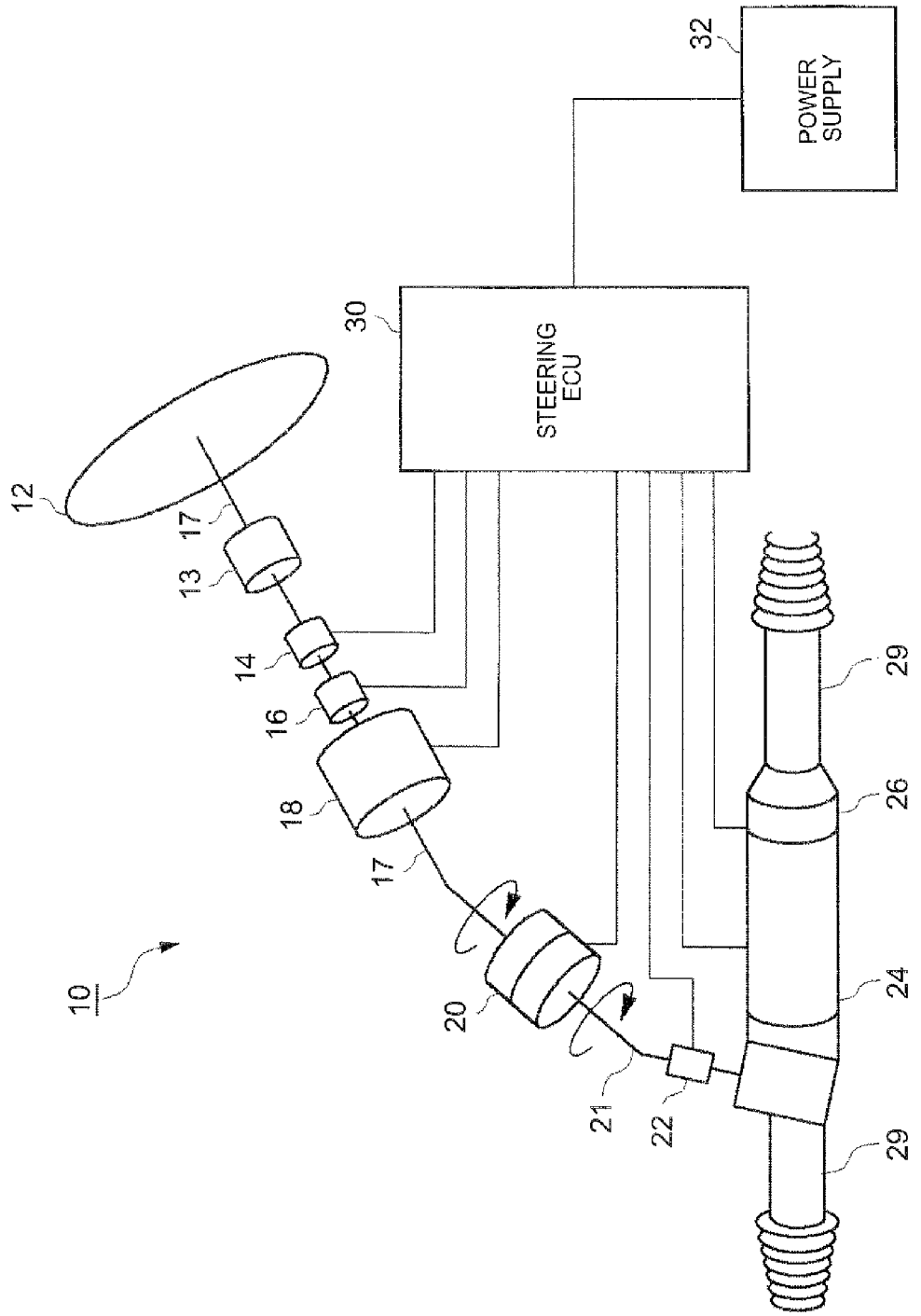
FIG. 1 is a view for illustrating the schematic configuration of a vehicle steering system according to an embodiment of the invention.

Hereinafter, embodiments of the invention will be described in detail with reference to the accompanying drawings. Like reference numerals denote the same elements in the drawings, and the overlap description is omitted where appropriate.

FIG. 1 is a view for illustrating the schematic configuration of a vehicle steering system according to an embodiment of the invention. The vehicle steering system 10 according to the present embodiment is a steering system that employs a steer-by-wire system.

The vehicle steering system 10 includes a steering wheel 12, a steering lock mechanism 13, a steering angle sensor 14, a steering torque sensor 16, a steering shaft 17, a steering reaction actuator 18, a backup clutch 20, a pinion shaft 21, a turning torque sensor 22, a turning actuator 24, a steered angle sensor 26, a steering electronic control unit (hereinafter, steering ECU) 30 and a power supply 32.

The steering wheel 12 is arranged at a driver seat side in a vehicle cabin, and functions as a steering member that is rotated by a driver in order for the driver to input a steering amount. The steering shaft 17 is connected to the steering wheel 12. The steering shaft 17 is rotatably supported on a vehicle body side.

The steering lock mechanism 13, the steering angle sensor 14, the steering torque sensor 16 and the steering reaction actuator 18 are provided on the steering shaft 17.

The steering lock mechanism 13 has the function of restricting rotation of the steering wheel 12.

The steering angle sensor 14 detects the rotation angle of the steering shaft 17, that is, the steering angle of the steering wheel 12, input by the driver. The steering angle of the steering wheel 12, detected by the steering angle sensor 14, is output to the steering ECU 30. The steering torque sensor 16 detects the rotation torque of the steering shaft 17, that is, the steering torque of the steering wheel 12, input by the driver. The steering torque of the steering wheel 12, detected by the steering torque sensor 16, is output to the steering ECU 30.

The steering ECU 30 is, for example, formed of a central processing unit (CPU), a read only memory (ROM), a random access memory (RAM) and a data bus that connects them with one another. The steering ECU 30 operates in accordance with a program stored in the ROM. The steering ECU 30 calculates a steering reaction that should be applied to the steering wheel 12 on the basis of input steering angle information. The steering ECU 30 controls the steering reaction actuator 18 such that the calculated steering reaction is applied to the steering wheel 12.

The steering reaction actuator 18 is, for example, formed of a steering reaction motor, a resolver, and the like. The resolver detects the rotation angle of the motor. The steering reaction actuator 18 applies the steering reaction to the steering wheel 12 via the steering shaft 17 on the basis of a command from the steering ECU 30.

The backup clutch 20 is provided at a wheel-side end portion of the steering shaft 17. The backup clutch 20 is arranged between the steering shaft 17 and the pinion shaft 21, and is configured to be able to mechanically connect the steering shaft 17 to the pinion shaft 21 or separate the steering shaft 17 from the pinion shaft 21 on the basis of a command from the steering ECU 30.

The turning torque sensor 22 is provided on the pinion shaft 21. The turning torque sensor 22 detects the rotation torque of the pinion shaft 21.

The turning actuator 24 is connected to a wheel-side end portion of the pinion shaft 21. The turning actuator 24 serves as a turning mechanism. The turning actuator 24 includes a rack-and-pinion mechanism. The turning actuator 24 is configured to be able to drive the pinion shaft 21 for rotation, and is configured to be able to move a steering rack 29 in a vehicle width direction via the rack-and-pinion mechanism in response to a command from the steering ECU 30. Steered wheels (not shown) are respectively connected to both ends of the steering rack 29 via tie rods (not shown), and the steered wheels are turned with movement of the steering rack 29.

The steered angle sensor 26 detects the amount of displacement of the turning actuator 24, that is, the steered angle of the steered wheels, and then outputs the detected value to the steering ECU 30.

The steering ECU 30 calculates the steered angle of the steered wheels based on the steering angle of the steering wheel 12, and controls the turning actuator 24 such that the steered angle is applied to the steered wheels.

The power supply 32 supplies electric power to the steering ECU 30 when an ignition switch is turned on by the driver. Electric power supplied from the power supply 32 is supplied to various sensors and actuators of the vehicle steering system 10 via the steering ECU 30.

In the thus configured vehicle steering system 10, when the system is normal, the steering shaft 17 and the pinion shaft 21 are mechanically separated from each other by the backup clutch 20 (clutch disengaged state). The steering shaft 17 is coupled to the steering wheel 12, and the pinion shaft 21 is coupled to the turning actuator 24, so the steering wheel 12 and the turning actuator 24 are separated from each other. It may also be regarded as a state where the steering wheel 12 and the steered wheels are separated from each other. When the driver operates the steering wheel 12 in this state, the steering angle sensor 14 detects the steering angle of the steering wheel 12. The steering ECU 30 calculates the steered angle based on the steering angle, and controls a turning motor 23 on the basis of the calculated steered angle. Thus, it is possible to vary the steered angle of the steered wheels on the basis of the steering angle of the steering wheel 12. In addition, the steering ECU 30 calculates a steering reaction based on the detected steering angle of the steering wheel 12, and controls the steering reaction actuator 18 on the basis of the steering reaction. Thus, the steering reaction is applied to the steering wheel 12, so it is possible to make the driver experience the steering reaction.

On the other hand, when there is an abnormality in the system, the steering shaft 17 and the pinion shaft 21 are mechanically connected to each other by the backup clutch 20 (clutch engaged state). That is, the steering wheel 12 and the turning actuator 24 are connected to each other, and it may also be regarded as a state where the steering wheel 12 and the steered wheels are connected to each other. When the driver operates the steering wheel 12 in this state, the rotation force of the steering shaft 17 is directly transmitted to the pinion shaft 21, so it is possible to directly turn the steered wheels through operation of the steering wheel 12.

Figure 2:
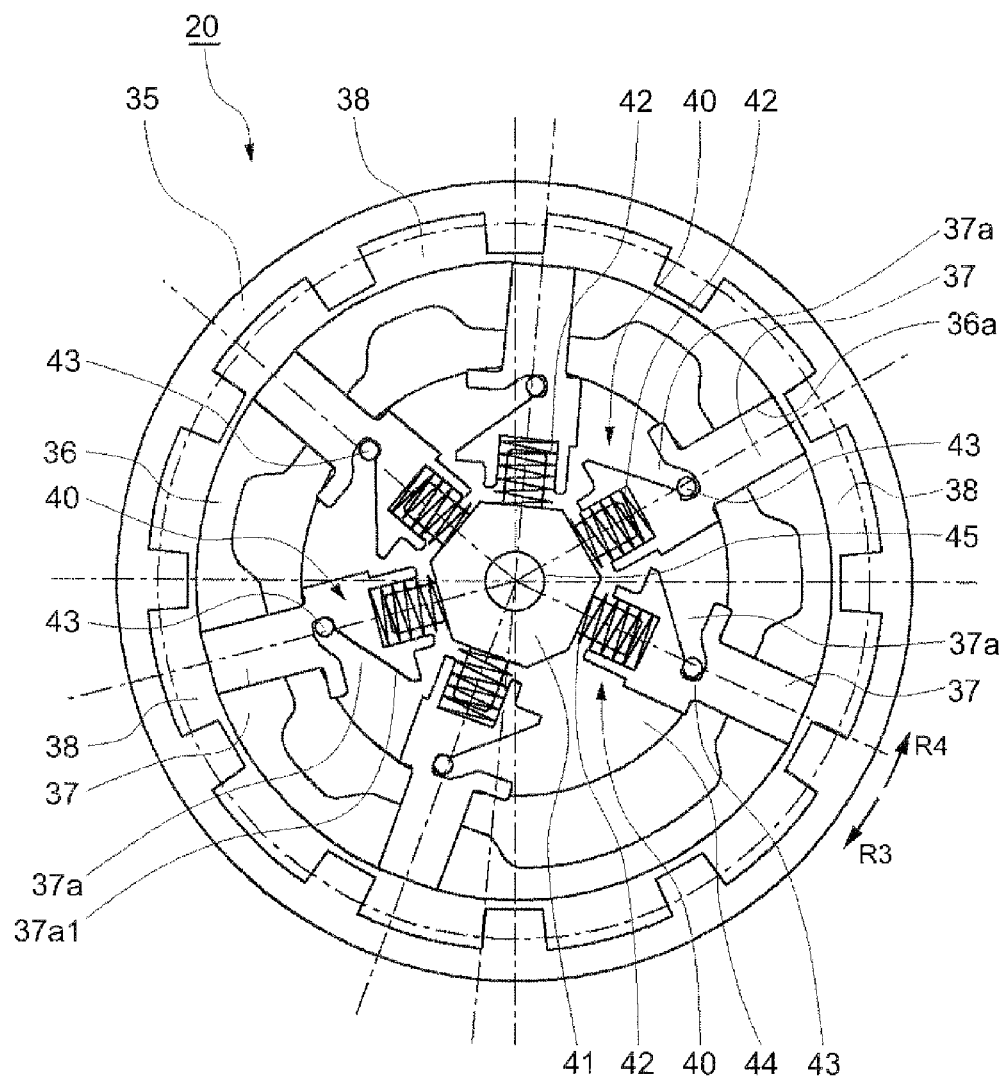
FIG. 2 is a cross-sectional view taken perpendicularly to an axis of a backup clutch according to the embodiment of the invention.

Next, the structure of the backup clutch 20 will be described in detail. FIG. 2 is a cross-sectional view taken perpendicularly to the axis of the backup clutch 20.

The backup clutch 20 includes an annular steering wheel-side housing 35, an annular wheel-side housing 36 and a plurality of lock bars 37. The plurality of lock bars 37 serve as engaging portions and are provided at the wheel-side housing 36 so as to be able to move radially of the wheel-side housing 36.

The steering wheel-side housing 35 has a plurality of lock grooves 38 at its inner periphery. The plurality of lock grooves 38 are formed at intervals in the circumferential direction. The wheel-side housing 36 is provided so as to be coaxial with the steering wheel-side housing 35, and is arranged such that at least part of the wheel-side housing 36 overlaps with the steering wheel-side housing 35 when the backup clutch 20 is viewed laterally.

The steering wheel-side housing 35 is coupled to the steering shaft 17 (see FIG. 1), and rotates in synchronization with rotation of the steering wheel 12. In addition, the wheel-side housing 36 is coupled to the pinion shaft 21 (see FIG. 1), and rotates in synchronization with a turn of the steered wheels. The backup clutch 20 further includes a projecting and retracting mechanism 40 that projects the lock bars 37 toward the lock grooves 38 or retracts the lock bars 37 away from the lock grooves 38. The details of the projecting and retracting mechanism 40 will be described later.

In the backup clutch 20 according to the present embodiment, the six lock bars 37 are arranged radially. Each lock bar 37 is slidably supported at an open portion 36a formed in the peripheral surface of the annular wheel-side housing 36.

A spring receiving member 41 is fixed to the wheel-side housing 36. The spring receiving member 41 has a plurality of protrusions at its outer periphery. The plurality of protrusions are arranged radially in correspondence with the lock bars 37. Each protrusion supports one end of a corresponding spring 42 such that the spring 42 does not deviate from its position. Each spring 42 serves as an urging member. The other end of each spring 42 is supported in a recess formed at a portion of the corresponding lock bar 37, facing the spring receiving member 41. Each spring 42 is compressed in a state shown in FIG. 2.

The projecting and retracting mechanism 40 includes a rotary solenoid, the springs 42, pins 43 and a rotary disc 44. The rotary solenoid serves as an actuator that is driven on electricity. The springs 42 respectively urge the lock bars 37 toward the lock grooves 38. The pins 43 act on the lock bars 37 to control projection and retraction of the lock bars 37. The pins 43 are fixed to the rotary disc 44.

The rotary solenoid is configured such that a shaft 45 rotates in an arrow R3 direction shown in FIG. 2 during energization (when the clutch is disengaged) and the shaft 45 rotates in an arrow R4 direction shown in FIG. 2 due to the action of an internal return spring during non-energization (when the clutch is engaged).

Each pin 43 is engaged with the corresponding lock bar 37 in a state where the pin 43 enters a cutout groove 37*a* provided from the center portion of the lock bar 37 toward the side face of the lock bar 37. In addition, each pin 43 contacts the cutout groove 37*a* of the corresponding lock bar 37 in a clutch disengaged state shown in FIG. 2, and recedes from the cutout groove 37*a* of the lock bar 37 in a clutch engaged state (described later).

The rotary disc 44 is fixed to the shaft 45 of the rotary solenoid, and rotates in a clockwise direction or counterclockwise direction in response to an energization state of the rotary solenoid. Then, the pins 43 also rotate in the clockwise direction or counterclockwise direction, and change the positions.

Next, the operation of the backup clutch 20 will be described. As shown in FIG. 2, in a state where the backup clutch 20 is disengaged, that is, in a state where the rotary solenoid is energized, the lock bars 37 and the lock grooves 38 are not engaged with each other at all. Therefore, the steering shaft 17 and the pinion shaft 21 are separated from each other, and no rotation force is transmitted therebetween.

More specifically, when the rotary solenoid is energized, the rotary disc 44 rotates in the arrow R3 direction shown in FIG. 2 together with the shaft 45 of the rotary solenoid. Then, each pin 43 enters into the bottom side of the corresponding cutout groove 37*a* while contacting a side wall 37*a*1 of the corresponding cutout groove 37*a*. Thus, the corresponding lock bar 37 is gradually drawn inward of the wheel-side housing 36, and, finally, the lock bar 37 is restricted at a position at which the backup clutch 20 is disengaged.

Figure 3:
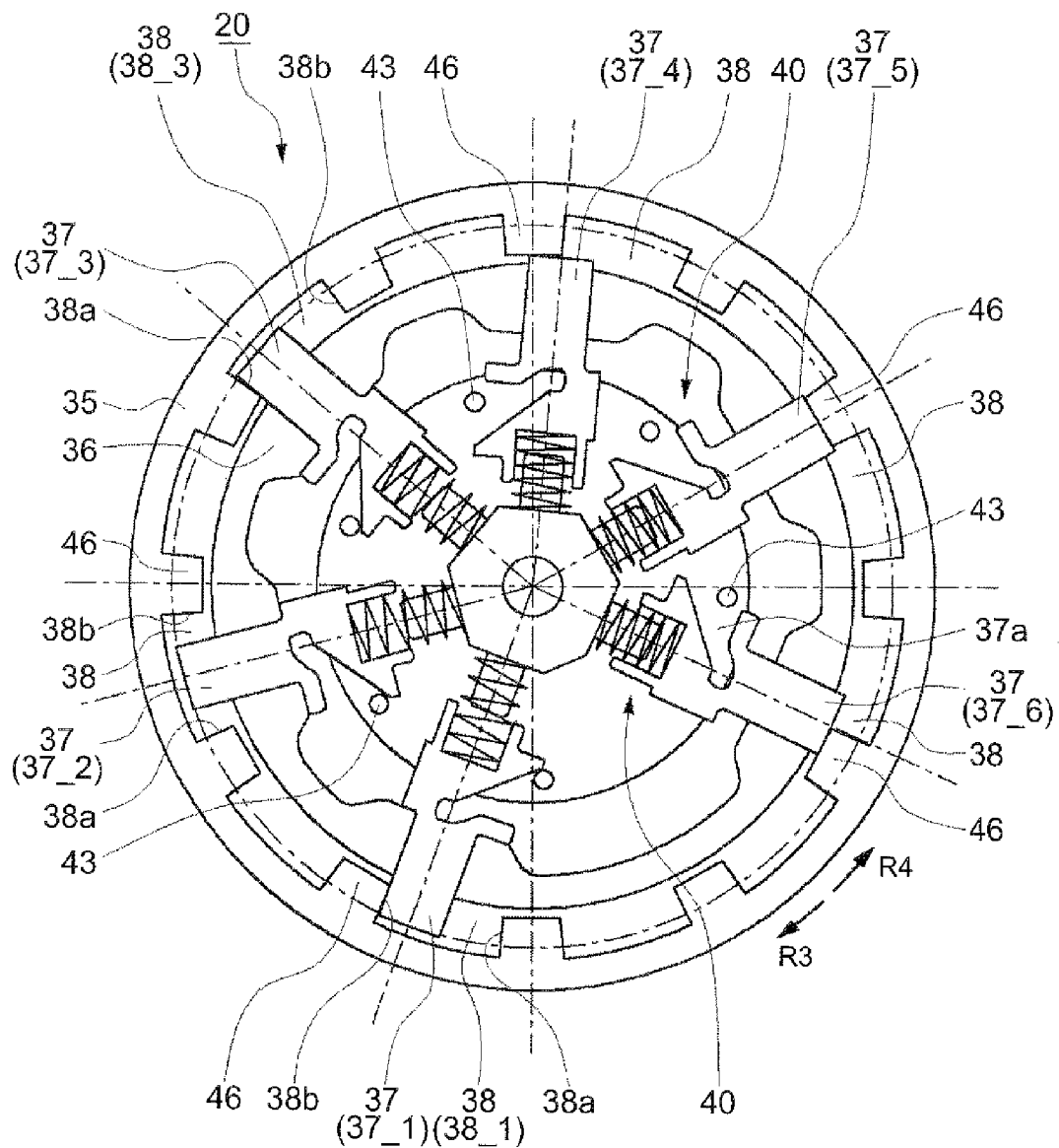
FIG. 3 is a cross-sectional view taken perpendicularly to the axis of the backup clutch according to the embodiment of the invention.

FIG. 3 is a cross-sectional view taken perpendicularly to the axis of the backup clutch 20 (clutch engaged state).

When the backup clutch 20 is not energized due to, for example, a failure of the system, the rotary disc 44 that has restricted the lock bars 37 till then rotates in the arrow R4 direction shown in FIG. 3 due to the action of the return spring of the rotary solenoid. As a result, the position of each pin 43 inside the cutout groove 37*a* of the corresponding lock bar 37 changes, and each pin 43 recedes from the inside of the cutout groove 37*a*. As a result, each lock bar 37 of which the position has been restricted by the corresponding pin 43 is allowed to move toward the lock grooves 38 of the steering wheel-side housing 35.

In this way, each lock bar 37 receives force for moving in the radial direction of the wheel-side housing 36 toward the lock grooves 38 of the steering wheel-side housing 35 due to the urging force of the corresponding spring 42; however, as shown in FIG. 3, the backup clutch 20 is not configured such that all the lock bars 37 enter the lock grooves 38.

That is, depending on a positional relationship between the lock bars 37 (hereinafter, may be referred to as lock bars 37_1 to 37_6 where appropriate) and the lock grooves 38, that is, a positional relationship between the steering wheel-side housing 35 and the wheel-side housing 36, a combination of the lock bars that enter the lock grooves 38 can change variously. In the backup clutch 20 shown in FIG. 3, there are the lock bars 37_1 to 37_3 that enter the lock grooves 38 and the lock bars 37_4 to 37_6 that do not enter the lock grooves 38 and that contact upper faces of protruding portions 46 each formed between any adjacent two of the lock grooves 38.

The state shown in FIG. 3 is the case where the backup clutch 20 is completely placed in the clutch engaged state, but this state is not always established immediately after energization of the rotary solenoid is stopped. Hereinafter, the operation until the backup clutch 20 is completely placed in the clutch engaged state through normal operation of the steering wheel 12 will be further described in detail.

For example, when the steering wheel-side housing 35 is located at a position slightly rotated from the state shown in FIG. 3 in the arrow R4 direction (the wheel-side housing 36 remains in the state shown in FIG. 3), the lock bars 37_2, 37_3 enter the lock grooves 38, but the lock bars 37_1, 37_4 to 37_6 are in contact with the upper faces of the protruding portions 46 formed at the inner peripheral wall of the steering wheel-side housing 35. In addition, in this case, the lock bars 37_2, 37_3 that have entered the lock grooves 38 each are not in contact with the side faces 38*a*, 38*b* of the lock groove 38. Therefore, there is a play in the rotation direction between the steering wheel-side housing 35 and the wheel-side housing 36.

When the steering wheel-side housing 35 is rotated from this state in the arrow R3 direction, the lock bar 37_1 enters the lock groove 38 and engages with the side face 38*b* of the lock groove 38 at the time when the lock bar 37_3 contacts the side face 38*a* of the lock groove 38 and engages with the side face 38*a*. As a result, as shown in FIG. 3, there is almost no play in the rotation direction (locked state) between the steering wheel-side housing 35 and the wheel-side housing 36 due to the lock bar 37_1 entering the lock groove 38_1 and engaged with the side face 38*b* and the lock bar 37_3 entering the lock groove 38_3 and engaged with the side face 38*a*. Therefore, it is possible to reliably transmit the rotation force of the steering shaft 17 to the pinion shaft 21.

In this way, in the backup clutch 20 according to the present embodiment, when the plurality of lock bars 37 are moved toward the plurality of lock grooves 38 by the projecting and retracting mechanism 40 including the rotary solenoid, the plurality of lock bars 37 include the lock bar 37_3 that enters the lock groove 383 that is one of the plurality of lock grooves 38 and the lock bar 37_1 that enters the lock groove 38_1 different from the lock groove 38_3 at the time when the lock bar 37_3 moves in the leftward rotation direction (arrow R4 direction in FIG. 3) in a state where the lock bar 37_3 is placed in the lock groove 38_3 and then engages with the side face 38*a* at the side in the rotation direction (arrow R4 direction) between the two side faces 38*a*, 38*b* of the lock groove 38_3, irrespective of a rotational phase difference between the steering wheel-side housing 35 and the wheel-side housing 36. The lock bar 37_1 is configured to, when the lock bar 37_1 has entered the lock groove 38_1, engage with the side face 38*b* at the other side in the rotation direction (arrow R3 direction) between the two side faces 38*a*, 38*b* of the lock groove 38_1.

Thus, the backup clutch 20 is able to set the vehicle steering system 10 in a separated state (clutch disengaged state) where no rotation force is transmitted between the steering shaft 17 and the pinion shaft 21 by retracting the lock bars 37 from the lock grooves 38 with the use of the projecting and retracting mechanism 40. On the other hand, in a state (locked state) where the steering wheel-side housing 35 and the wheel-side housing 36 are connected to each other by the projecting and retracting mechanism 40, because the lock bar 37_3 is engaged with the side face 38a at the side in the other rotation direction (arrow R4 direction) between the two side faces of the lock groove 38_3, when the steering wheel-side housing 35 rotates in one rotation direction (for example, arrow R3 direction), the backup clutch 20 is able to transmit rotation force to the wheel-side housing 36 with almost no play. In addition, because the lock bar 37_1 is engaged with the side face 38b at the side in the one rotation direction (arrow R3 direction) between the two side faces of the lock groove 38_1, when the steering wheel-side housing 35 rotates in the other rotation direction (for example, arrow R4 direction), the backup clutch 20 is able to transmit rotation force to the wheel-side housing 36 with almost no play.

In addition, the backup clutch 20 is configured to retract the lock bars 37 away from the lock grooves 38 with force larger than the urging force of the springs 42 through the operation at the time when the rotary solenoid is energized, and to cause the lock bar 37_2 and the lock bar 37_3 to enter the lock grooves 38 due to the urging force of the springs 42 when the rotary solenoid is not energized. Thus, in an emergency in which energization of the rotary solenoid is stopped, the lock bar 37_2 and the lock bar 37_3 enter the lock grooves 38, and the steering wheel-side housing 35 and the wheel-side housing 36 are immediately connected to each other.

Here, a "deviation angle" is defined as a parameter that indicates the characteristic of the backup clutch 20. The deviation angle is a maximum rotation angle required to achieve the clutch engaged state. At any relative phase between the steering wheel-side housing 35 and the wheel-side housing 36, the clutch engaged state is achieved when one of the steering wheel-side housing 35 and the wheel-side housing 36 is rotated by the deviation angle with respect to the other. The deviation angle is determined on the basis of the number, width and pitch of the lock grooves 38, the number, width and pitch of the lock bars 37, and the like. For example, in the backup clutch 20 shown in FIG. 2 and FIG. 3, the deviation angle is about 5 degrees. When the deviation angle is set to a small value, the steering shaft 17 and the pinion shaft 21 are mechanically coupled to each other through slight operation of the steering wheel 12 at the time of an abnormality of the system, so the response of fail-safe of the vehicle steering system 10 is improved.

Figure 4:
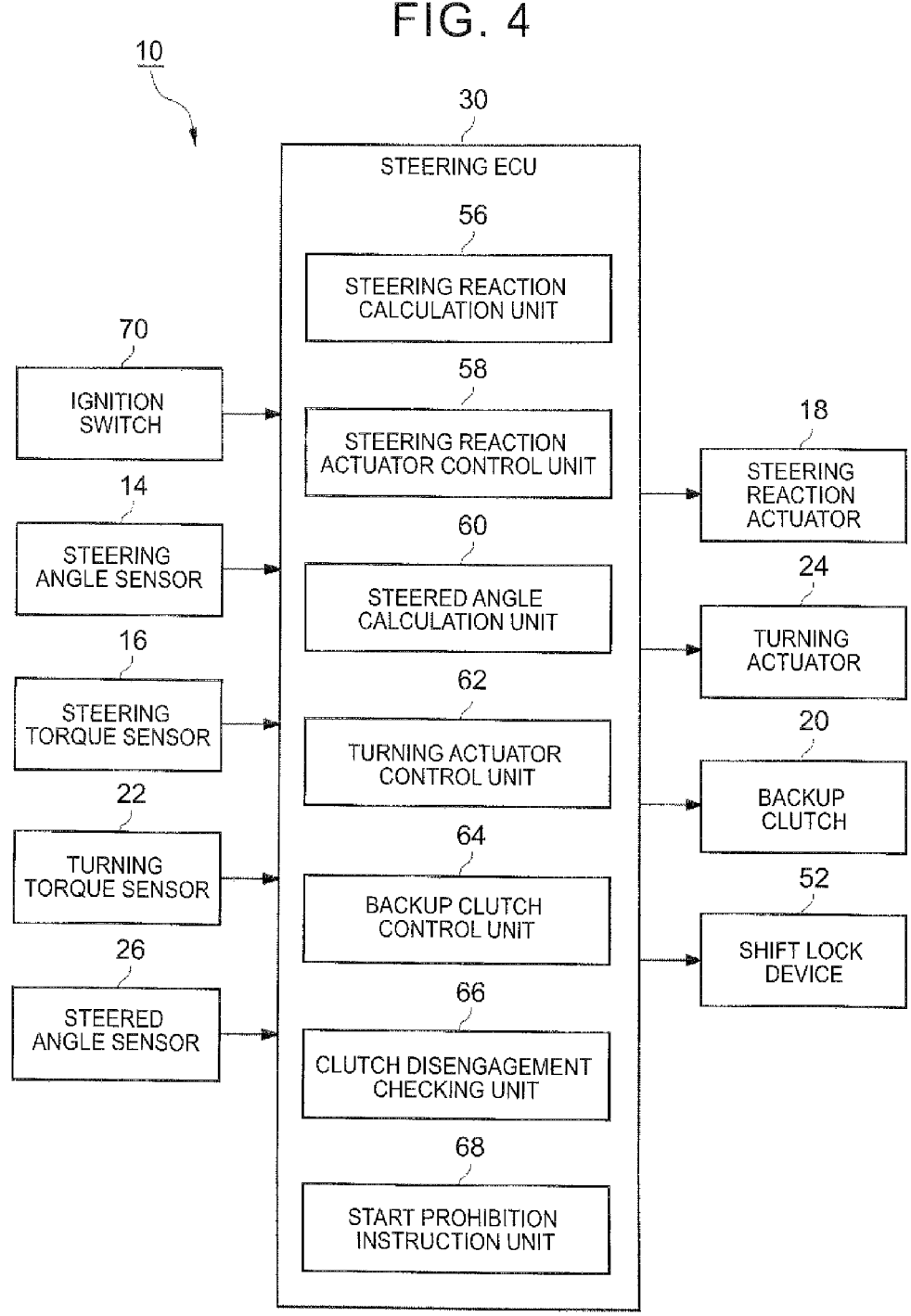
FIG. 4 is a functional block diagram for illustrating the configuration of the vehicle steering system according to the embodiment of the invention.

FIG. 4 is a functional block diagram for illustrating the configuration of the vehicle steering system 10 according to the present embodiment.

As shown in FIG. 4, an on/off signal from an ignition switch 70, a steering angle signal from the steering angle sensor 14, a steering torque signal from the steering torque sensor 16, a turning torque signal from the turning torque sensor 22, a steered angle signal from the steered angle sensor 26, and the like, are input to the steering ECU 30.

The steering ECU 30 includes a steering reaction calculation unit 56, a steering reaction actuator control unit 58, a steered angle calculation unit 60, a turning actuator control unit 62, a backup clutch control unit 64, a clutch disengagement checking unit 66 and a start prohibition instruction unit 68.

The steering reaction calculation unit 56 calculates a steering reaction that should be applied to the steering wheel 12 (see FIG. 1) on the basis of the steering angle signal from the steering angle sensor 14. The steering reaction actuator control unit 58 controls the steering reaction actuator 18 such that the steering reaction calculated by the steering reaction calculation unit 56 is applied to the steering wheel 12.

The steered angle calculation unit 60 calculates a steered angle based on the steering angle of the steering wheel 12. The turning actuator control unit 62 controls the turning actuator 24 such that the steered angle calculated by the steered angle calculation unit 60 is applied to the steered wheels.

The backup clutch control unit 64 controls the backup clutch 20. As described above, when the backup clutch 20 is energized from the backup clutch control unit 64, the backup clutch 20 is disengaged, and the steering wheel 12 and the turning actuator 24 are mechanically separated from each other. On the other hand, when the backup clutch 20 is not energized from the backup clutch control unit 64, the backup clutch 20 is engaged, and the steering wheel 12 and the turning actuator 24 are mechanically connected to each other or placed in a connectable state. In the present embodiment, after the on signal is input from the ignition switch 70, the backup clutch control unit 64 energizes the backup clutch 20 to disengage the clutch.

The clutch disengagement checking unit 66 checks whether the backup clutch 20 is actually disengaged, in other words, connection between the steering wheel 12 and the turning actuator 24 is actually interrupted. Checking whether the backup clutch 20 is disengaged is, for example, performed as follows. First, the steering wheel 12 is fixed by controlling the steering reaction actuator 18. After that, the turning actuator 24 is operated such that the pinion shaft 21 rotates by the deviation angle or above. When the pinion shaft 21 is rotatable by the deviation angle or above, the clutch disengagement checking unit 66 determines that the backup clutch 20 is disengaged. On the other hand, when the pinion shaft 21 is not rotatable by the deviation angle or above, the backup clutch 20 determines that the backup clutch 20 is not disengaged.

The start prohibition instruction unit 68 issues instructions for prohibiting a start of the vehicle until the clutch disengagement checking unit 66 confirms that the backup clutch 20 is disengaged. For example, when the vehicle is an automatic transmission vehicle, the start prohibition instruction unit 68 causes a shift lever not to be moved from a P (parking) position by controlling a shift lock device 52. In addition, when the vehicle is a manual transmission vehicle, an engine is stopped by, for example, stopping fuel when the driver attempts to start the vehicle by depressing a clutch pedal. A driver's start operation may be, for example, detected by a switch that detects depression of the clutch pedal. The switch is mounted for a so-called clutch start system. As described above, at the time of checking whether the backup clutch 20 is disengaged, a turn by a set angle is required. By prohibiting a start of the vehicle until it is confirmed that the backup clutch 20 is disengaged, the operation of the clutch disengagement checking unit 66 to check whether the backup clutch 20 is disengaged after a start of the vehicle is avoided, so it is possible to prevent a turn not intended by the driver or occurrence of unnatural steering reaction due to the checking operation, and it is possible to improve the safety of the vehicle steering system 10 while suppressing driver's discomfort.

Figure 5:
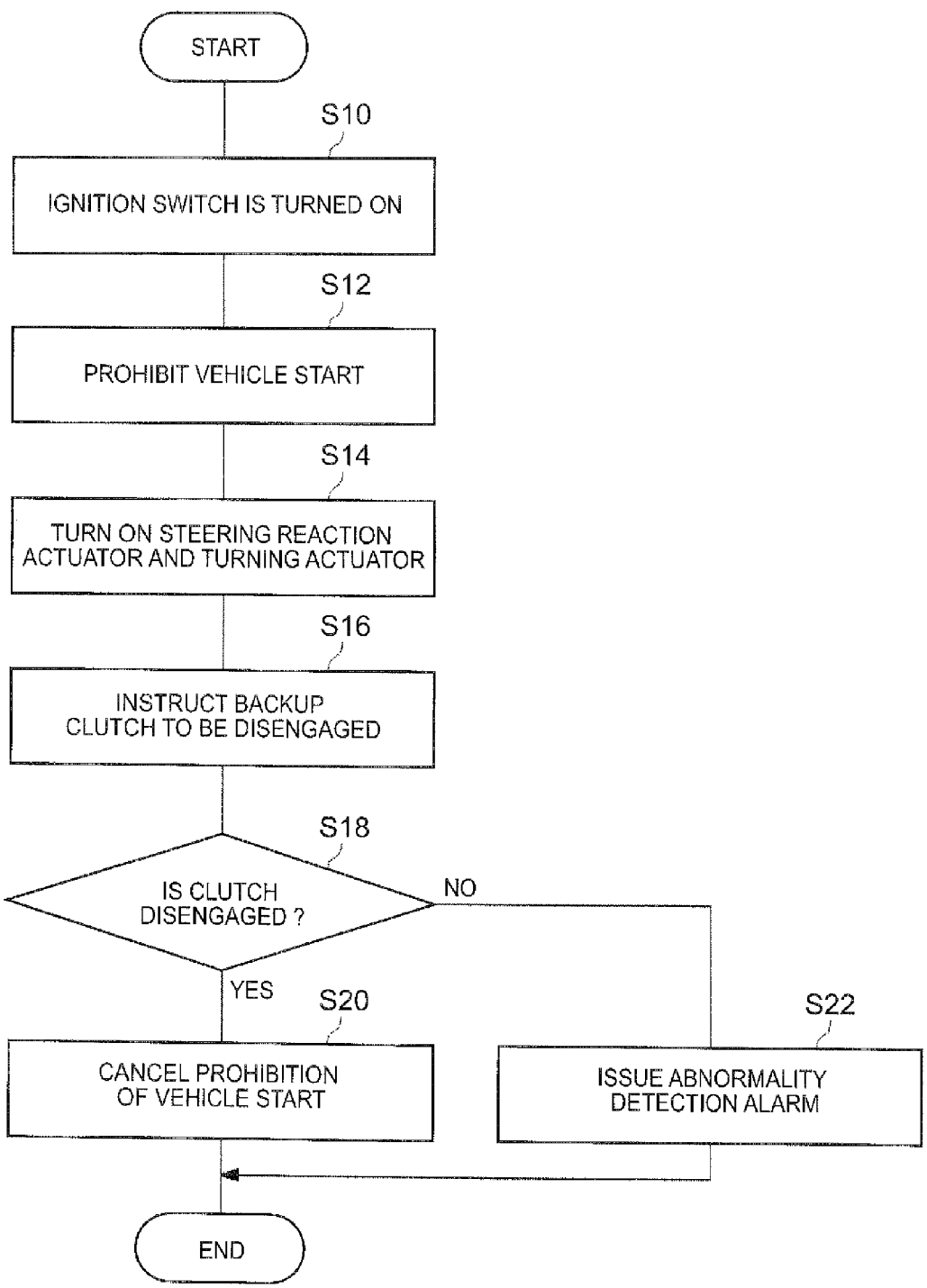
FIG. 5 is a flowchart for illustrating control that is executed by the vehicle steering system according to the embodiment of the invention.

FIG. 5 is a flowchart for illustrating control that is executed by the vehicle steering system 10 according to the present embodiment. Control shown in FIG. 5 is executed when the ignition switch 70 is turned on, and is a so-called initial check of the vehicle steering system 10. Here, description will be made on the assumption that the vehicle steering system 10 is mounted on an automatic transmission vehicle.

When the on signal is input from the ignition switch 70 (S10), the start prohibition instruction unit 68 issues instructions to the shift lock device 52 such that the shift lever cannot be moved from the P position (S12).

After that, electric power is supplied from the steering ECU 30, and the steering reaction actuator 18 and the turning actuator 24 are turned on (S14).

In addition, the backup clutch control unit 64 instructs the backup clutch 20 to be disengaged (S16). That is, control is executed such that energization of the backup clutch 20 is started and the backup clutch 20 is disengaged.

After that, the clutch disengagement checking unit 66 checks whether the backup clutch 20 is actually disengaged (S18). A method of checking whether the backup clutch 20 is disengaged is as described above.

When it has been confirmed that the backup clutch 20 is disengaged (YES in S18), the start prohibition instruction unit 68 instructs the shift lock device 52 to cancel prohibition of vehicle start (S20). Specifically, the start prohibition instruction unit 68 instructs the shift lock device 52 to cancel locking of the shift lever. The initial check of the vehicle steering system 10 has been completed in S20, and then normal steer-by-wire steering control is executed.

On the other hand, when it has been confirmed that the backup clutch 20 is still not disengaged (NO in S18), the clutch disengagement checking unit 66 issues an alarm in order to inform the driver that the system is abnormal (S22). The type of alarm is not specifically limited. For example, the alarm may be a method, such as sounding an alarm sound and lighting up an alarm lamp. The initial check of the vehicle steering system 10 has been completed in S22, and the driver is allowed to take measures, such as inspecting an abnormal location of the system.

As described above, with the vehicle steering system 10 according to the present embodiment, it is possible to check whether the backup clutch 20 is disengaged at the initial check. Thus, it is possible to reduce the probability that steer-by-wire control is started while the steering wheel 12 and the steered wheels remain mechanically connected to each other, so it is possible to improve the safety of the vehicle steering system 10.

With the vehicle steering system 10 according to the present embodiment, a start of the vehicle is prohibited until it has been confirmed that the backup clutch 20 is disengaged at the initial check. Therefore, the operation of the clutch disengagement checking unit 66 to check whether the backup clutch 20 is disengaged after a start of the vehicle is avoided. That is, it is possible to prevent a turn not intended by the driver or occurrence of unnatural steering reaction due to the checking operation, and it is possible to improve the safety of the vehicle steering system 10 while suppressing driver's discomfort.

Figure 6:
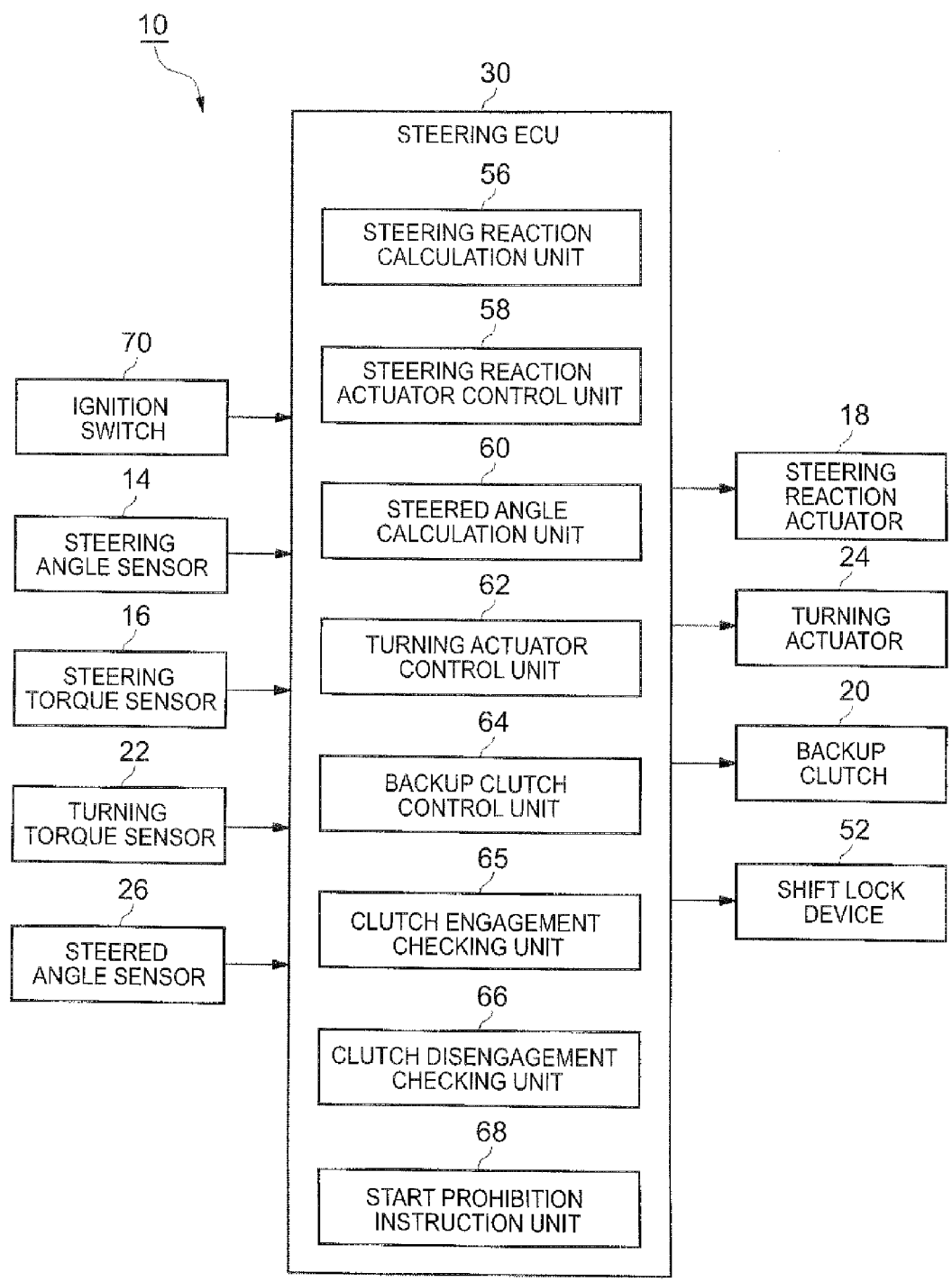
FIG. 6 is a functional block diagram for illustrating the configuration of a vehicle steering system according to another embodiment of the invention.

FIG. 6 is a functional block diagram for illustrating the configuration of the vehicle steering system 10 according to another embodiment of the invention. In the vehicle steering system 10 shown in FIG. 6, like reference numerals denote the same or corresponding elements to those of the vehicle steering system shown in FIG. 4, and the overlap description is omitted.

The vehicle steering system 10 according to the present embodiment differs from the vehicle steering system shown in FIG. 4 in that the steering ECU 30 further includes a clutch engagement checking unit 65.

The clutch engagement checking unit 65 checks whether the backup clutch 20 is normally engaged. In other words, the clutch engagement checking unit 65 checks whether the steering wheel 12 and the turning actuator 24 are normally connected to each other. In the present embodiment, the clutch engagement checking unit 65 checks whether the backup clutch 20 is normally engaged while engagement instructions are being issued to the backup clutch 20 by the backup clutch control unit 64.

The clutch engagement checking unit 65, for example, checks whether the backup clutch 20 is normally engaged as follows. First, the steering wheel 12 is fixed by controlling the steering reaction actuator 18. After that, the turning actuator 24 is operated such that the pinion shaft 21 is rotated by the deviation angle or above. When the pinion shaft 21 is not rotatable by the deviation angle or above, the clutch engagement checking unit 65 determines that the backup clutch 20 is able to be normally engaged. On the other hand, when the pinion shaft 21 is rotatable by the deviation angle or above, the clutch engagement checking unit 65 determines that the backup clutch 20 is not able to be normally engaged.

Figure 7:
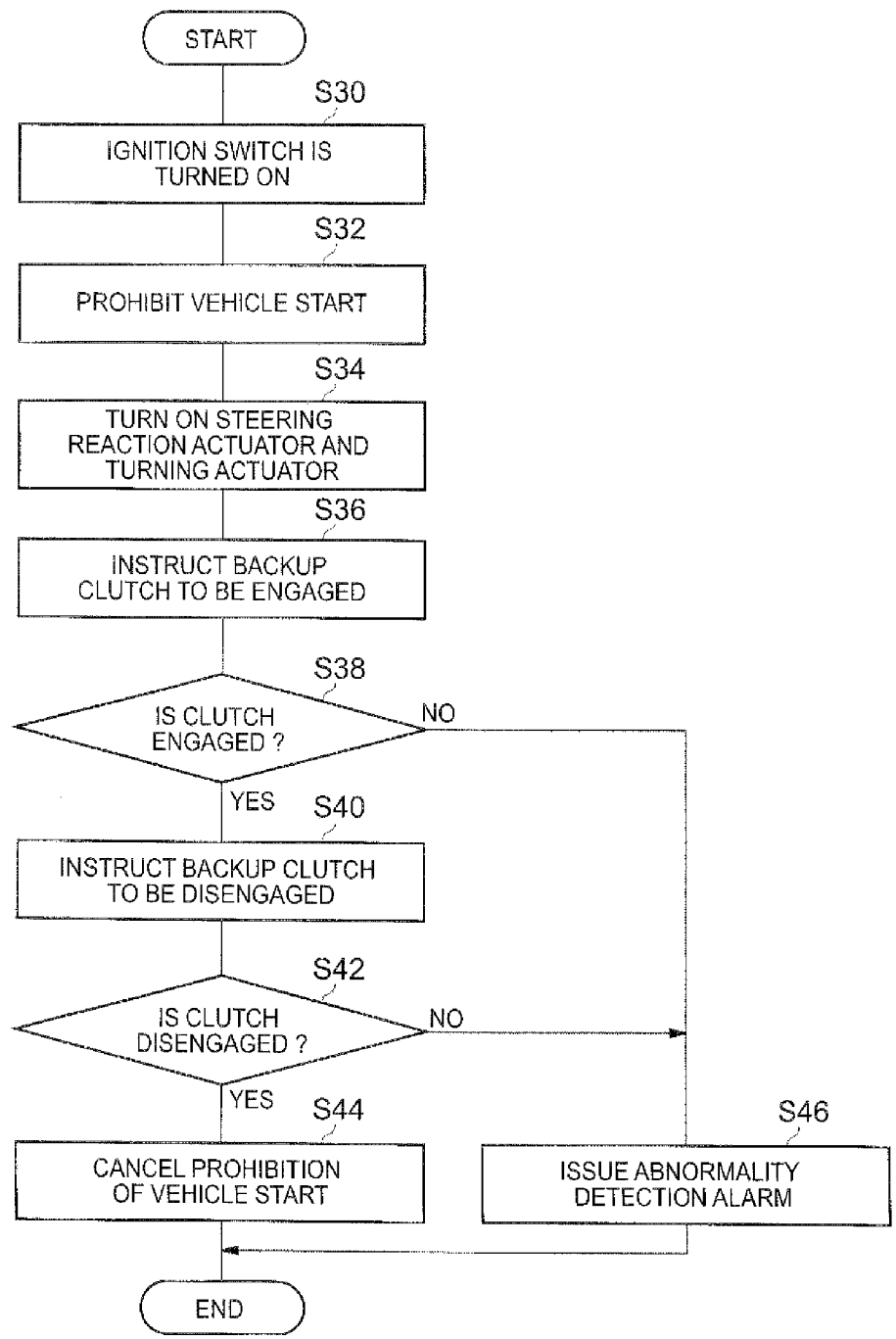
FIG. 7 is a flowchart for illustrating control that is executed by the vehicle steering system according to the another embodiment of the invention.

FIG. 7 is a flowchart for illustrating control that is executed by the vehicle steering system 10 according to the present embodiment. Control shown in FIG. 7 is executed when the ignition switch 70 is turned on, and is also a so-called initial check of the vehicle steering system 10. Here, description will be made on the assumption that the vehicle steering system 10 is mounted on an automatic transmission vehicle.

When the on signal is input from the ignition switch 70 (S30), the start prohibition instruction unit 68 issues instructions to the shift lock device 52 such that the shift lever cannot be moved from the P position (S32).

After that, electric power is supplied from the steering ECU 30, and the steering reaction actuator 18 and the turning actuator 24 are turned on (S34).

Subsequently, the backup clutch control unit 64 issues engagement instructions to the backup clutch 20 (S36). That is, the backup clutch control unit 64 stops energization of the backup clutch 20.

Subsequently, the clutch engagement checking unit 65 checks whether the backup clutch 20 has been normally engaged (S38). A method of checking whether the backup clutch 20 is normally engaged is as described above.

When it has been confirmed that the backup clutch 20 has been normally engaged (YES in S38), the backup clutch control unit 64 instructs the backup clutch 20 to be disengaged (S40). That is, control is executed such that energization of the backup clutch 20 is started and the backup clutch 20 is disengaged.

On the other hand, when it has been confirmed that the backup clutch 20 has not been normally engaged (NO in S38), the clutch engagement checking unit 65 issues an alarm in order to inform the driver that the system is abnormal (S46).

After S40, the clutch disengagement checking unit 66 checks whether the backup clutch 20 is actually disengaged (S42). A method of checking whether the backup clutch 20 is disengaged may be similar to that of the embodiment shown in FIG. 4.

When it has been confirmed that the backup clutch 20 is disengaged (YES in S42), the start prohibition instruction unit 68 issues instructions to the shift lock device 52 to cancel prohibition of vehicle start (S44). Specifically, the start prohibition instruction unit 68 instructs the shift lock device 52 to cancel locking of the shift lever. The initial check of the vehicle steering system 10 has been completed in S44, and then normal steer-by-wire steering control is executed.

On the other hand, when it has been confirmed that the backup clutch 20 is still not disengaged (NO in S42), the clutch disengagement checking unit 66 issues an alarm in order to inform the driver that the system is abnormal (S46).

As described above, the vehicle steering system 10 according to the present embodiment has such an advantage that it is possible to check whether the backup clutch 20 is able to be normally engaged at the initial check in addition to the advantage described in the embodiment shown in FIG. 4. Thus, it is possible to further improve the safety of the vehicle steering system 10.

The invention is described on the basis of the embodiments. These embodiments are illustrative, and various alternative embodiments are possible in combinations of the elements and the processes.

The clutch disengagement checking unit 66 may check whether the clutch is disengaged when the ignition switch of the vehicle is turned on. In this case, it is possible to detect an abnormality of the system at the initial check of the system.

A clutch engagement checking unit 65 that checks whether the steering member and the turning mechanism are normally connected to each other by the clutch may be further included, and the clutch disengagement checking unit 66 may check whether the clutch is normally disengaged after the clutch engagement checking unit 65 has confirmed that the clutch is normally engaged. In this case, it is possible to check whether the clutch is able to be normally engaged.

A start prohibition unit that prohibits a start of the vehicle until the clutch disengagement checking unit 66 confirms that the clutch is disengaged may be further included. In this case, a start of the vehicle is prohibited until it has been confirmed that the clutch is disengaged, so the operation of the clutch disengagement checking unit 66 to check whether the clutch is disengaged after a start of the vehicle is avoided, so it is possible to prevent a turn not intended by the driver or occurrence of unnatural steering reaction due to the checking operation, and it is possible to further improve the safety of the vehicle steering system while suppressing driver's discomfort.

What is claimed is:

1. A steering system comprising:
   a steering member that is configured to steer a vehicle;
   a turning mechanism that is configured to turn a wheel of the vehicle;
   a clutch arranged between the steering member and the turning mechanism and that is configured to mechanically connect the steering member to the turning mechanism;
   a disengagement checking unit that is configured to check whether the clutch is disengaged, wherein the disengagement checking unit determines whether or not the clutch is disengaged based on whether or not the turning mechanism is not rotatable by a deviation angle or above; and
   a vehicle start prohibition unit that is configured to prohibit a start of the vehicle until the disengagement checking unit confirms that the clutch is disengaged.

2. The steering system according to claim 1, further comprising:
   an ignition switch mounted on the vehicle, wherein
   the disengagement checking unit is configured to check whether the clutch is disengaged when the ignition switch is turned on.

3. The steering system according to claim 1, further comprising:
   a connection checking unit that is configured to check whether the steering member and the turning mechanism are normally connected to each other by the clutch, wherein
   the disengagement checking unit is configured to check whether the clutch is disengaged after the connection checking unit has confirmed that the steering member and the turning mechanism are normally connected to each other by the clutch.

4. The steering system according to claim 1, wherein the deviation angle is a maximum rotation angle required to achieve a state in which the clutch is engaged.

5. The steering system according to claim 4, wherein the disengagement checking unit determines that the clutch is engaged when the turning mechanism is not rotatable by the deviation angle or above.

6. The steering system according to claim 4, wherein the disengagement checking unit determines that the clutch is disengaged when the turning mechanism is rotatable by the deviation angle or above.

* * * * *